J. C. SIMPSON.
WRENCH.
APPLICATION FILED APR. 21, 1908.
908,617.
Patented Jan. 5, 1909.
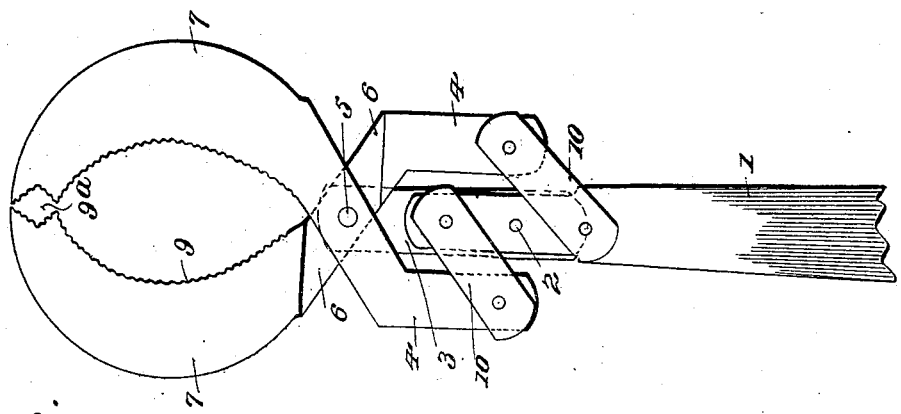
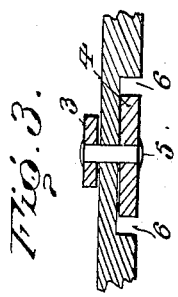
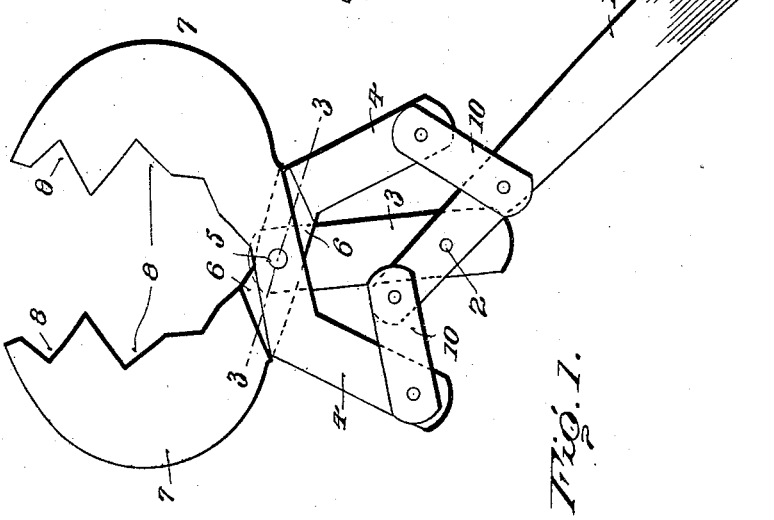
Witnesses
Inventor
John C Simpson
By
Lacey, Attorneys

UNITED STATES PATENT OFFICE.

JOHN C. SIMPSON, OF MOUNDSVILLE, WEST VIRGINIA.

WRENCH.

No. 908,617.  Specification of Letters Patent.  Patented Jan. 5, 1909.

Application filed April 21, 1908. Serial No. 428,389.

*To all whom it may concern:*

Be it known that I, JOHN C. SIMPSON, citizen of the United States, residing at Moundsville, in the county of Marshall and State of West Virginia, have invented certain new and useful Improvements in Wrenches, of which the following is a specification.

The object of this invention is an improved wrench which is arranged to be quickly, conveniently and positively operated by the movement of the handle in one direction to effectually grip the work, and in the other direction to release the same, which will automatically adjust itself to the size of the work, and which is particularly adapted for use with nuts, pipes or other work of that character.

With this and other objects in view that will more fully appear as the description proceeds, the invention consists in certain constructions and arrangements of the parts that I shall hereinafter fully describe and then point out the novel features thereof, in the appended claims.

For a full understanding of the invention and the merits thereof, and to acquire a knowledge of the details of construction, reference is to be had to the following description and accompanying drawing, in which:

Figure 1 is a plan view showing one embodiment of the invention; Fig. 2 is a similar view illustrating another embodiment thereof; and, Fig. 3 is a section on the line 3—3 of Fig. 1.

Corresponding and like parts are referred to in the following description and indicated in all the views of the drawing, by the same reference characters.

My improved wrench embodies a handle 1 that may be of any desired construction or design, and which is pivoted near its forward end, as indicated at 2, to one end of a bar 3. This bar 3 carries two arms 4 that are arranged to cross at a point intermediate of their ends, and which are pivoted together at such point and to the other end of the bar 3, as indicated at 5, the contacting faces of the arms being correspondingly recessed near their pivotal connection, as indicated at 6, so as to permit the arms to operate in the same plane. The forward ends of these arms constitute jaws 7, while the rear ends of the arms are preferably angularly disposed so as to extend rearwardly parallel to the handle 1 when the jaws are closed, and are connected to said handle by means of two links 10 which are pivoted at one end to the rear ends of the respective arms, and the other ends of which are pivotally connected to the handle, one in front of and one behind the pivotal point 2. By this construction, there is provided between the rear ends of the arms 4, a toggle mechanism, of which the handle forms a part, so that upon the movement of the handle to the right, the links 10 are spread apart, thus spreading the ends of the arms and effecting the opening of the jaws.

In the practical use of my improved wrench, the handle 1 is moved to open the jaws 7, to embrace the work, the handle being then moved to the left, which obviously closes the jaws with great force, and causes them to clamp the work, the continued movement of the handle to effect the rotation of the work, causing said jaws to grip the work more firmly.

In the form of the device designed for use with nuts, the opposing edges of the jaws 7 are correspondingly notched, as indicated at 8, while in another form of the invention arranged for use with pipe work, the jaws are curved outwardly, as shown, so that their forward extremities will abut against each other, when the jaws are closed, the inner edges of the jaws being preferably serrated, as indicated at 9, and the abutting edges being notched, as shown at 9ª. When the wrench is used to rotate a nut, the extremities of the jaws 7 are closed about the same, so that the nut is received in the corresponding recesses 8. When it is desired to rotate the work in the opposite direction, the wrench is turned over and operated substantially as before described.

From the above description, in connection with the accompanying drawing, it will be apparent that I have provided a simple, durable and efficient construction of wrench which may be conveniently and positively operated by the movement of the handle, to cause the jaws to forcibly grip the work or quickly release the same.

Having thus described the invention, what I claim is:

1. A wrench comprising a handle, a bar pivotally connected to the handle, arms crossing at an intermediate point and pivoted at such point to the bar, the forward ends of such arms constituting jaws, and a toggle mechanism between the rear ends of the arms and of which the handle forms a part.

2. A wrench comprising a handle, a bar pivotally connected to the handle, arms crossing at an intermediate point and pivoted at such point to the bar, the forward ends of such arms constituting jaws, and links pivotally connected to the rear ends of the arms and to the handle and coöperating with the latter to form a toggle mechanism.

3. A wrench comprising a handle, a bar pivotally connected at one end to the handle, arms crossing at an intermediate point and pivotally connected at such point to the other end of the bar, the forward ends of said arms constituting jaws, and links pivotally connected to the rear ends of the arms and having their other ends pivoted to the handle, one in front of and one behind the pivotal connection of the handle to the bar.

4. A wrench comprising a handle, crossed arms pivotally connected together and constituting jaws, means for connecting the handle to the common pivot point of the arms, and a toggle mechanism interposed between the arms and of which the handle forms a part.

In testimony whereof I affix my signature in presence of two witnesses.

JOHN C. SIMPSON. [L. S.]

Witnesses:
W. G. McGlumphy,
W. D. Stewart.